(12) United States Patent
Winzeler et al.

(10) Patent No.: US 7,419,307 B2
(45) Date of Patent: Sep. 2, 2008

(54) ROTARY MACHINE

(75) Inventors: James Elmer Winzeler, East Peoria, IL (US); Joshua Grant Goddard, Peoria, IL (US); David D. Smith, Fairview, IL (US)

(73) Assignee: Caterpillar Inc., Peoria, IL (US)

( * ) Notice: Subject to any disclaimer, the term of this patent is extended or adjusted under 35 U.S.C. 154(b) by 178 days.

(21) Appl. No.: 11/239,128

(22) Filed: Sep. 30, 2005

(65) Prior Publication Data

US 2007/0076998 A1    Apr. 5, 2007

(51) Int. Cl.
*F16C 33/46* (2006.01)

(52) U.S. Cl. ........................ 384/572; 384/564
(58) Field of Classification Search ............... 384/572, 384/575, 576, 580, 559, 560, 564, 551, 569; 475/348

See application file for complete search history.

(56) References Cited

U.S. PATENT DOCUMENTS

| | | | |
|---|---|---|---|
| 1,402,071 A | | 1/1922 | Huther |
| 1,995,571 A | * | 3/1935 | Lott ............................ 384/564 |
| 2,651,552 A | | 9/1953 | Pitner |
| 2,853,893 A | | 9/1958 | Magnuson |
| 3,261,234 A | * | 7/1966 | Broschard et al. ............ 475/348 |
| 3,352,178 A | * | 11/1967 | Lindgren et al. ............. 475/343 |
| 4,174,141 A | | 11/1979 | Reiss |
| 4,222,620 A | * | 9/1980 | Mirring ....................... 384/576 |
| 4,522,516 A | | 6/1985 | Neese |
| 4,613,239 A | | 9/1986 | Hofmann et al. |
| 4,657,414 A | * | 4/1987 | Stella .......................... 384/548 |
| 4,907,898 A | * | 3/1990 | Dickinson ................... 384/564 |
| 4,909,644 A | | 3/1990 | Owens |
| 4,916,750 A | | 4/1990 | Scott |
| 5,211,486 A | | 5/1993 | Aqvist |
| 5,234,274 A | | 8/1993 | Honda et al. |

(Continued)

FOREIGN PATENT DOCUMENTS

JP    2004270838    9/2004

OTHER PUBLICATIONS

NTN Bearing Corporation, "Cylindrical Roller Bearings," printed from the internet on Sep. 29, 2005, pp. 28-38.

*Primary Examiner*—Thomas R Hannon
(74) *Attorney, Agent, or Firm*—Finnegan, Henderson, Farabow, Garrett & Dunner (57) ABSTRACT

A rotary machine may include an inner component and a first group of cylindrical rollers disposed around the inner component. Each of the cylindrical rollers may have end-faces. The rotary machine may further include an outer component with a first cylindrical inner surface disposed against the cylindrical rollers. Additionally, the rotary machine may include a first bearing cage associated with the first group of cylindrical rollers. At least a portion of the first bearing cage may be disposed inside the first cylindrical inner surface, and the first bearing cage and the first cylindrical inner surface may be associated with one another in such a manner to maintain the first bearing cage substantially concentric to the first cylindrical inner surface. The rotary machine may also include a first axial stop configured to limit axial movement between the outer component and one or more of the cylindrical rollers. Additionally, the rotary machine may include a second axial stop configured to limit axial movement between one or more of the cylindrical rollers and a component of the rotary machine other than the outer component.

23 Claims, 6 Drawing Sheets

U.S. PATENT DOCUMENTS

| | | |
|---|---|---|
| 5,255,985 A | 10/1993 | Alling |
| 5,324,119 A | 6/1994 | Harimoto et al. |
| 5,332,317 A | 7/1994 | Niwa et al. |
| 5,332,318 A * | 7/1994 | Chiba .................. 384/569 |
| 5,335,416 A | 8/1994 | Alling |
| 5,474,388 A | 12/1995 | Kellström et al. |
| 5,538,348 A | 7/1996 | Honda et al. |
| 5,735,614 A | 4/1998 | Isogawa |
| 6,007,254 A | 12/1999 | Fujioka et al. |
| 6,152,606 A | 11/2000 | Shirosaki et al. |
| 6,203,205 B1 | 3/2001 | Murai et al. |
| 6,206,576 B1 | 3/2001 | Wiehl |
| 6,296,395 B1 | 10/2001 | Brand et al. |
| 6,367,983 B1 * | 4/2002 | Muntnich et al. ........... 384/580 |
| 2004/0247215 A1 | 12/2004 | Ohtsuki et al. |

\* cited by examiner

ROTARY MACHINE

TECHNICAL FIELD

The present disclosure relates to rotary machines and, more particularly, to rotary machines with cylindrical bearing rollers.

BACKGROUND

Many systems implement a rotary machine that may include an inner component, such as a shaft, and an outer component, such as a gear, that surrounds the inner component. The inner component and outer component may be engaged to one another in a manner allowing relative rotation between them about an axis of rotation. Some such rotary machines may include bearing rollers between the inner component and the outer component and a bearing cage for separating the bearing rollers from one another. The bearing rollers of such rotary machines may be cylindrical rollers that extend parallel to the axis of rotation. Cylindrical bearing rollers generally act to locate an inner component and an outer component relative to one another in directions perpendicular to the axis of rotation. However, the configurations of many rotary machines with cylindrical bearing rollers prevents the cylindrical bearing rollers from locating the inner component and the outer component relative to one another in directions parallel to the axis of rotation.

U.S. Pat. No. 4,613,239 ("the '239 patent") shows a cylindrical roller bearing with a radial inner ring, a radial outer ring, and a plurality of cylindrical rollers disposed between the radial inner ring and the radial outer ring. The cylindrical roller bearing of the '239 patent also includes a cage that extends circumferentially between the radial inner ring and the radial outer ring and that separates the cylindrical rollers from one another circumferentially. The radial inner ring and the radial outer ring include flanges that abut end-faces of the cylindrical rollers, which prevents relative axial movement between the radial inner ring and the radial outer ring. The cage rides on the cylindrical rollers as they travel around the radial inner ring.

Although the cylindrical roller bearing of the '239 patent limits relative axial movement between the radial inner ring and the radial outer ring, Because the cylindrical rollers provide the only support for the cage in radial directions, if the cage is subjected to large, unbalanced radial forces, the cage may shift to an eccentric position with respect to the radial inner ring. For example, if the bearing is used with a planet gear of a planetary gear set, the bearing cage may be subjected to large centrifugal forces. In such an application, as the carrier of the planetary gear set rotates, the planet gear and bearing travel a circular path. As a result, when the carrier rotates at high speeds, the bearing cage may be subjected to large centrifugal forces that may shift the bearing cage to an eccentric position with respect to an axis around which the bearing cage and the cylindrical rollers are disposed. This may interfere with smooth operation of the cylindrical roller bearing. Additionally, the cylindrical rollers of the '239 patent have a relatively large diameter and small length, which may be unsuitable for some applications.

The rotary machine of the present disclosure solves one or more of the problems set forth above.

SUMMARY OF THE INVENTION

One disclosed embodiment relates to a rotary machine that may include an inner component and a first group of cylindrical rollers disposed around the inner component. Each of the cylindrical rollers may have end-faces. The rotary machine may further include an outer component with a first cylindrical inner surface disposed against the cylindrical rollers. Additionally, the rotary machine may include a first bearing cage associated with the first group of cylindrical rollers. At least a portion of the first bearing cage may be disposed inside the first cylindrical inner surface, and the first bearing cage and the first cylindrical inner surface may be associated with one another in such a manner to maintain the first bearing cage substantially concentric to the first cylindrical inner surface. The rotary machine may also include a first axial stop configured to limit axial movement between the outer component and one or more of the cylindrical rollers. Additionally, the rotary machine may include a second axial stop configured to limit axial movement between one or more of the cylindrical rollers and a component of the rotary machine other than the outer component.

Another embodiment relates to a rotary machine that may include a carrier that is rotatable around carrier rotation axis. The rotary machine may also include an inner component mounted to the carrier, the inner component being disposed at a distance from the carrier rotation axis. Additionally, the rotary machine may include an outer component extending around the inner component. The rotary machine may further include a first group of cylindrical rollers and a first bearing cage associated with the first group of cylindrical rollers disposed between the inner component and the outer component. Furthermore, the rotary machine may include a first axial stop configured to limit axial movement between the outer component and one or more of the cylindrical rollers. The rotary machine may also include a second axial stop configured to limit axial movement between one or more of the cylindrical rollers and a component of the rotary machine other than the outer component.

A further embodiment relates to a rotary machine that may include an inner component and an outer component extending around the inner component. The rotary machine may also include a first group of cylindrical rollers disposed between the inner component and the outer component. Each of the cylindrical rollers may have end-faces. Additionally, the rotary machine may include a first bearing cage associated with the first group of cylindrical rollers and disposed between the inner component and the outer component. The rotary machine may further include a first axial stop configured to limit axial movement between the outer component and one or more of the cylindrical rollers. Furthermore, the rotary machine may include a second axial stop configured to limit axial movement between one or more of the cylindrical rollers and a component of the rotary machine other than the outer component. A first portion of the first bearing cage disposed axially-outward of and adjacent the end-faces of the cylindrical rollers may have a first radial dimension. Additionally, at least a portion of the bearing cage disposed between end-faces of one of the cylindrical rollers may have a radial dimension greater than the first radial dimension.

DETAILED DESCRIPTION

Figure 1:
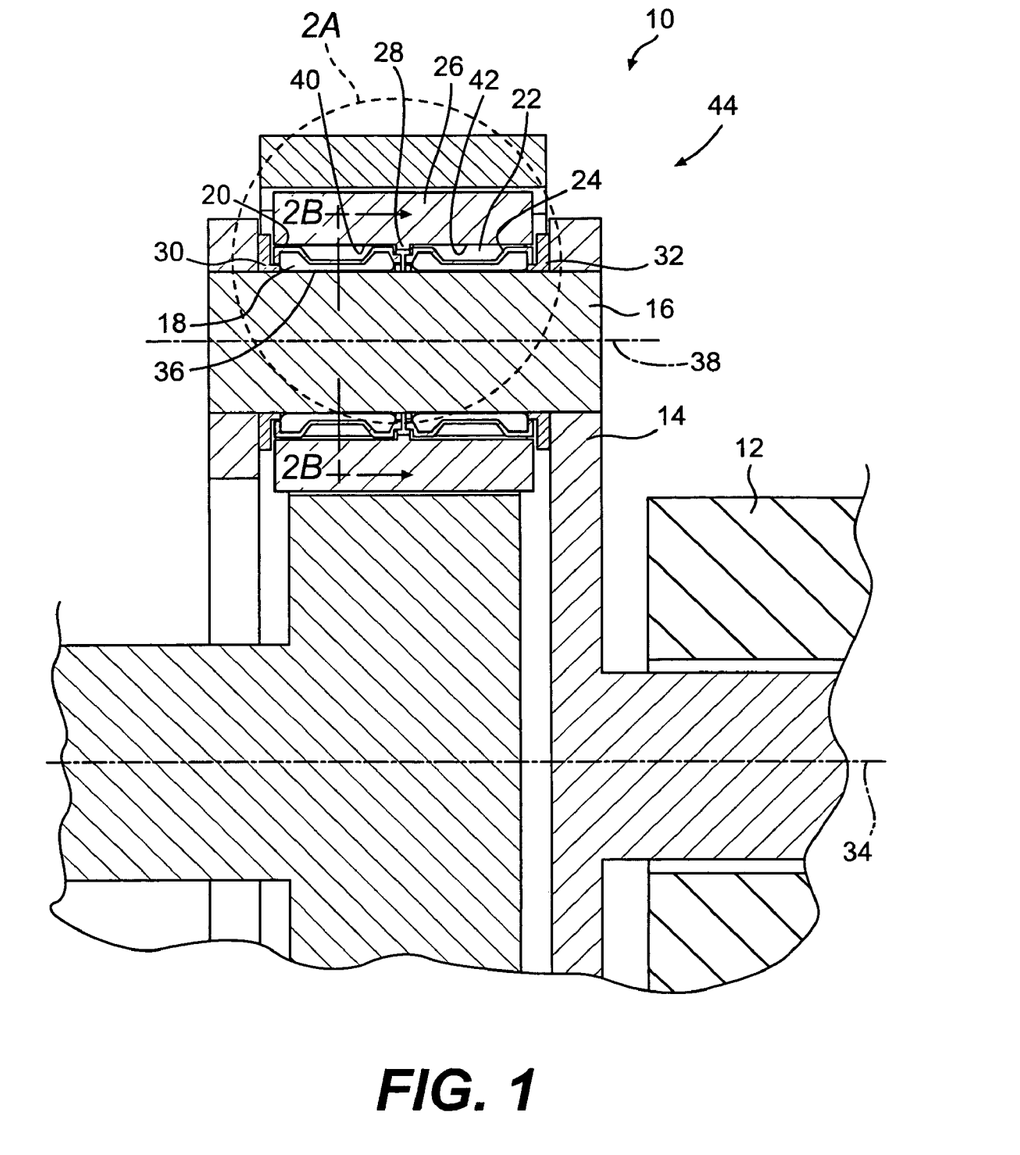
FIG. 1 is a sectional illustration of one embodiment of a rotary machine according to the present disclosure.

FIG. 1 provides a sectional view of a rotary machine 10. Rotary machine 10 may include a frame 12, a carrier 14, an inner component 16, a first set of cylindrical rollers 18, a first bearing cage 20, a second set of cylindrical rollers 22, a second bearing cage 24, an outer component 26, and axial stops 28, 30, and 32.

Frame 12 may be engaged to carrier 14 in such a manner to allow carrier 14 to rotate around a carrier rotation axis 34. Carrier 14 may support inner component 16 at a distance from carrier rotation axis 34. Outer component 26 may extend around inner component 16. Cylindrical rollers 18, 22 may reside between inner component 16 and outer component 26 and radially locate outer component 26 with respect to inner component 16.

Rotary machine 10 may be a power-transmission system, including a planetary gear system. Carrier 14 may be a planet gear carrier, inner component 16 may be a shaft, and outer component 26 may be a planet gear. In some embodiments, carrier 14, inner component 16, outer component 26, cylindrical rollers 18, 22, and bearing cages 20, 24 may be part of a planet gear set 44. Planet gear set 44 may include additional shafts and planet gears mounted to carrier 14 in a substantially circular pattern about carrier rotation axis 34.

Rotary machine 10 is not limited to the configuration illustrated in FIG. 1. For example, inner component 16 may be a type of component other than a shaft, such as a bearing race. In such embodiments, rotary machine 10 may or may not include a shaft disposed inside inner component 16. Similarly, outer component 26 may be a type of component other than a planet gear, such as a bearing race. In such embodiments, a planet gear may or may not surround outer component 26. Furthermore, outer component 26 may be stationary and cylindrical rollers 18, 22, bearing cages 20, 24 and inner component 16 may be supported from outer component 26. Moreover, rotary machine 10 may omit cylindrical rollers 18 and bearing cage 20 or cylindrical rollers 22 and bearing cage 24.

Figure 2A:
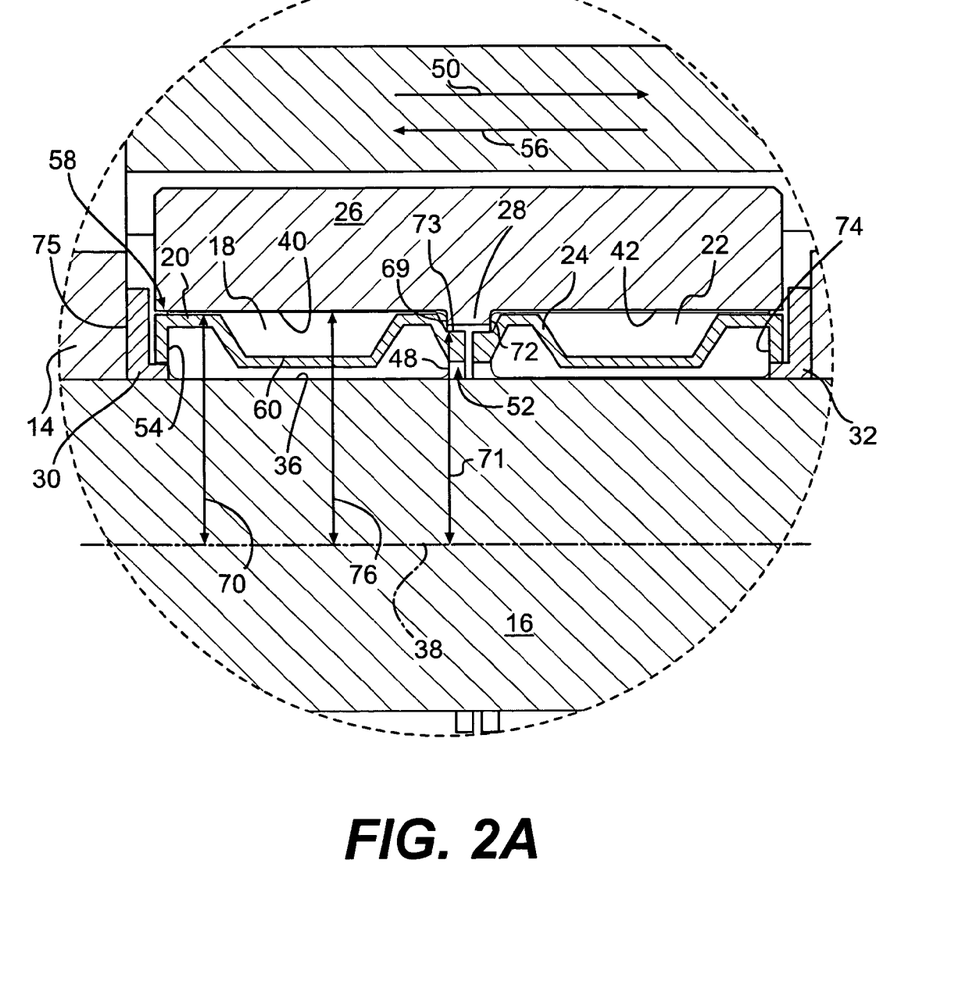
FIG. 2A is an enlarged view of the portion of FIG. 1 shown in circle 2A.
Figure 2B:
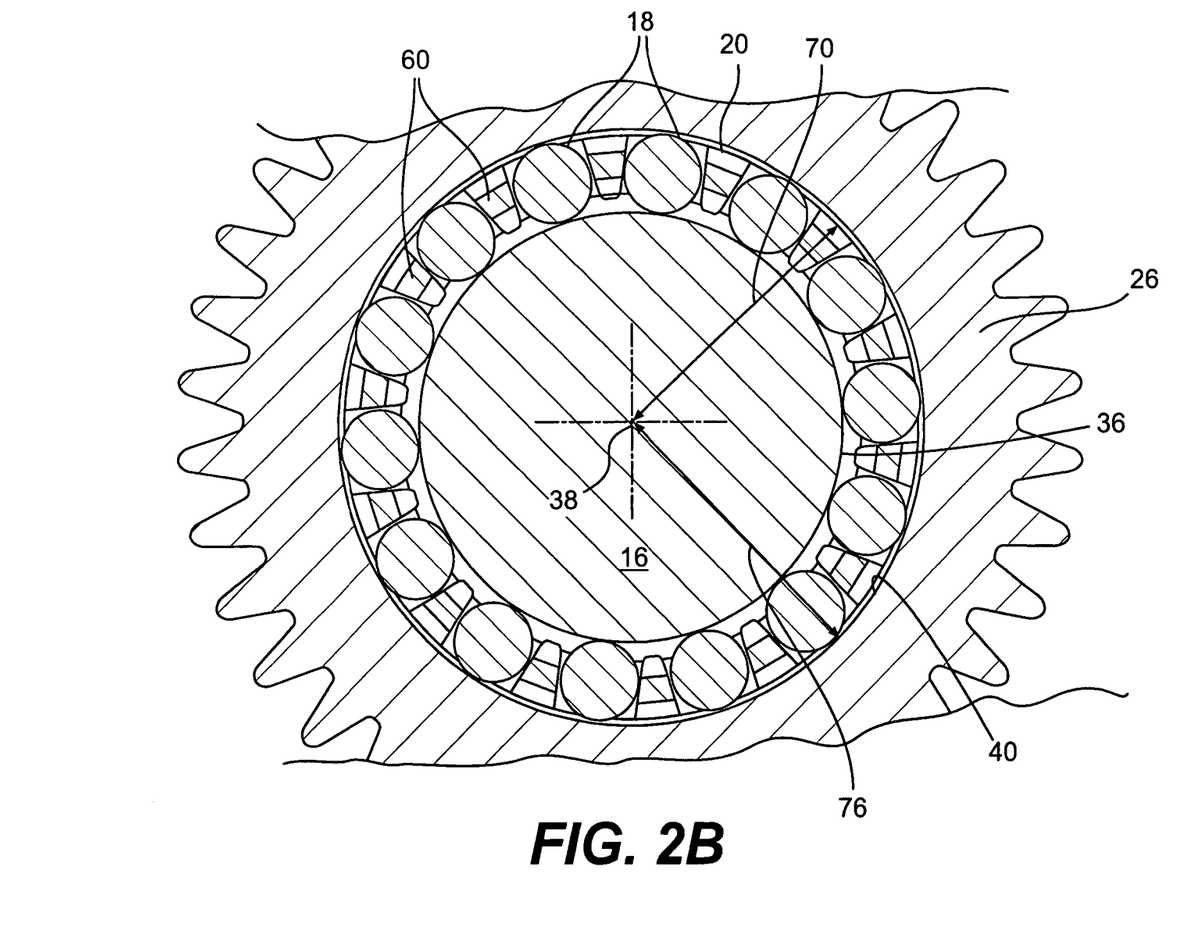
FIG. 2B is a sectional illustration of the embodiment of rotary machine shown in FIGS. 1 and 2A, through line 2B-2B of FIG. 1.

FIGS. 2A and 2B illustrate inner component 16, cylindrical rollers 18, 22, bearing cages 20, 24 and outer component 26 in greater detail. As is best shown by FIG. 2B, cylindrical rollers 18 may be arranged in a substantially circular pattern against a cylindrical outer surface 36 of inner component 16. Each cylindrical roller 18 may include a first end-face 48 (FIG. 2A) that faces in a first direction 50 adjacent a first end 52 of bearing cage 20 and a second-end-face 54 that faces in a second direction 56 adjacent a second end 58 of bearing cage 20. Similarly, each cylindrical roller 22 may include a first end-face 72 and a second end-face 74.

Bearing cage 20 may include a plurality of bars 60. As is best shown by FIG. 2B,.each bar 60 may be disposed between a pair of cylindrical rollers 18. As best shown in FIG. 2A bearing cage 20 may leave at least a portion of first end-faces 48 and/or second end-faces 54 of cylindrical rollers 18 exposed. For example, as FIG. 2A shows, bearing cage 20 may leave radially-outer portions 69 of first end-faces 48 exposed. In some embodiments, a maximum radial dimension 70 of portions of bearing cage 20 between first end-faces 48 and second end-faces 54 may be greater than a radial dimension 71 of a portion 73 of bearing cage 20 axially outward of cylindrical rollers 18 adjacent first end-faces 48.

Outer component 26 may include cylindrical inner surfaces 40, 42 disposed against cylindrical rollers 18, 22 respectively. Cylindrical inner surface 40 may have a radius 76 only slightly larger than a maximum radial dimension 70 of portions of bearing cage 20 between first end-faces 48 and second end-faces 54 of cylindrical rollers 18.

Each axial stop 28, 30, 32 may limit axial movement between cylindrical rollers 18, 22 and one or more other components of rotary machine 10. For example, axial stop 28 may be a rib that extends radially inward from adjacent cylindrical inner surface 40 and abuts radially-outer portions 69 of first end-faces 48 of cylindrical rollers 18. This may limit axial movement of outer component 26 in second direction 56, with respect to cylindrical rollers 18. Axial stop 28 may also abut first end-faces 72 of cylindrical rollers 22, thereby limiting axial movement of outer component 26 in first direction 50, with respect to cylindrical rollers 22. Axial stop 30 may be a load ring that extends around inner component 16 between second end-faces 54 of cylindrical rollers 18 and a portion 75 of carrier 14, thereby limiting axial movement of cylindrical rollers 18 in second direction 56, with respect to carrier 14. Axial stop 32 may also be a load ring that limits axial movement of cylindrical rollers 22 in first direction 50, with respect to carrier 14.

The configurations of axial stops 28, 30, 32 and the manners in which they are associated with other components of rotary machine 10 are not limited to the embodiment illustrated in FIG. 2A. For example, axial stops 28, 30, 32 may have different shapes and may abut different portions of cylindrical rollers 18, 22 than shown in FIG. 2A. Additionally, rather than being an integral part of outer component 26, axial stop 28 may be captured between a portion of outer component 26 and cylindrical rollers 18. Similarly, axial stops 30, 32 may be an integral part of carrier 14, or otherwise fixedly engaged thereto, rather than abutting it. Furthermore, axial stops 30, 32 may limit axial movement of cylindrical rollers 18, 22 with respect to other components in addition to, or in place of, carrier 14.

Figure 3A:
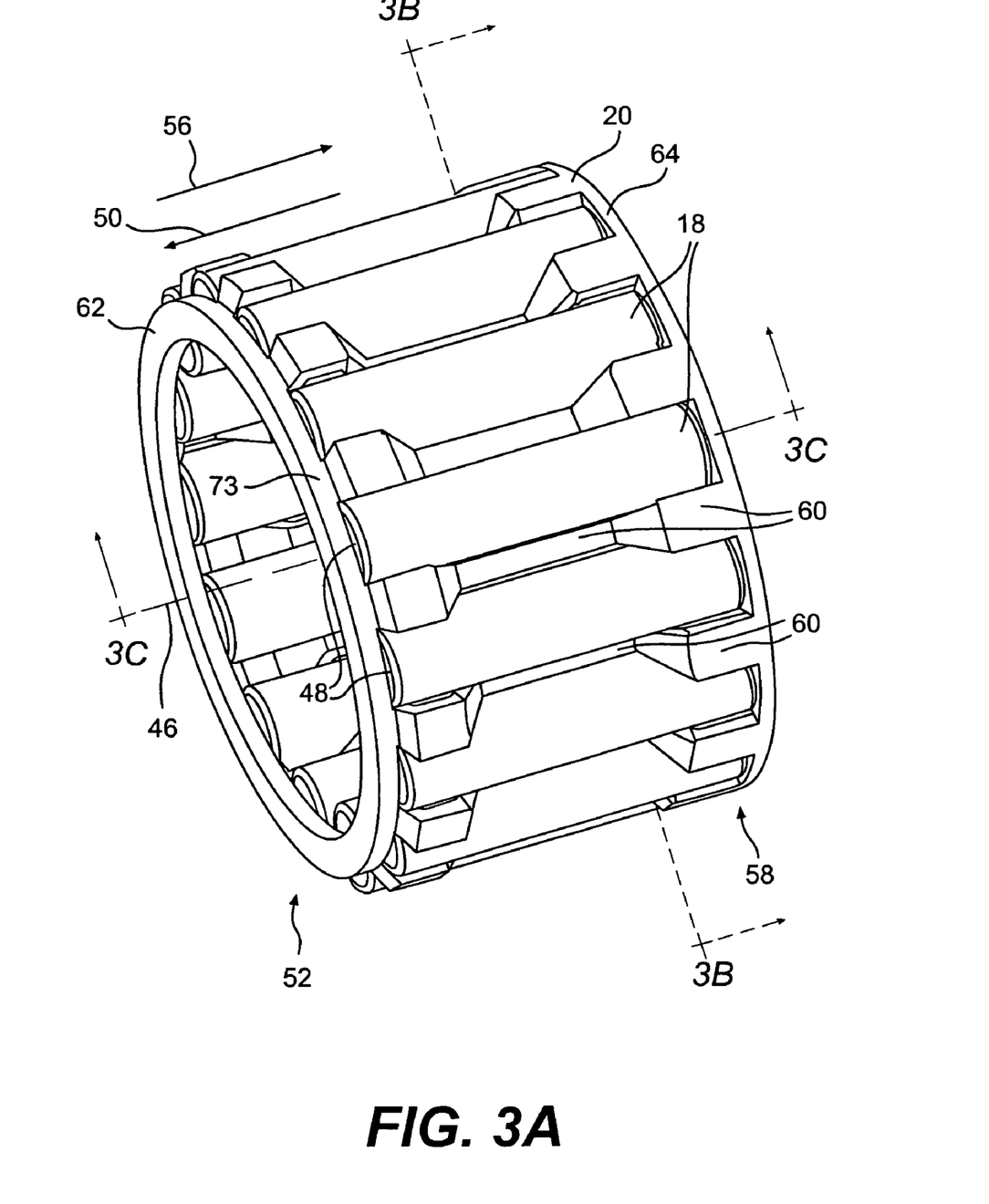
FIG. 3A is a perspective illustration of one embodiment of bearing rollers and a bearing cage according to the present disclosure.
Figure 3B:
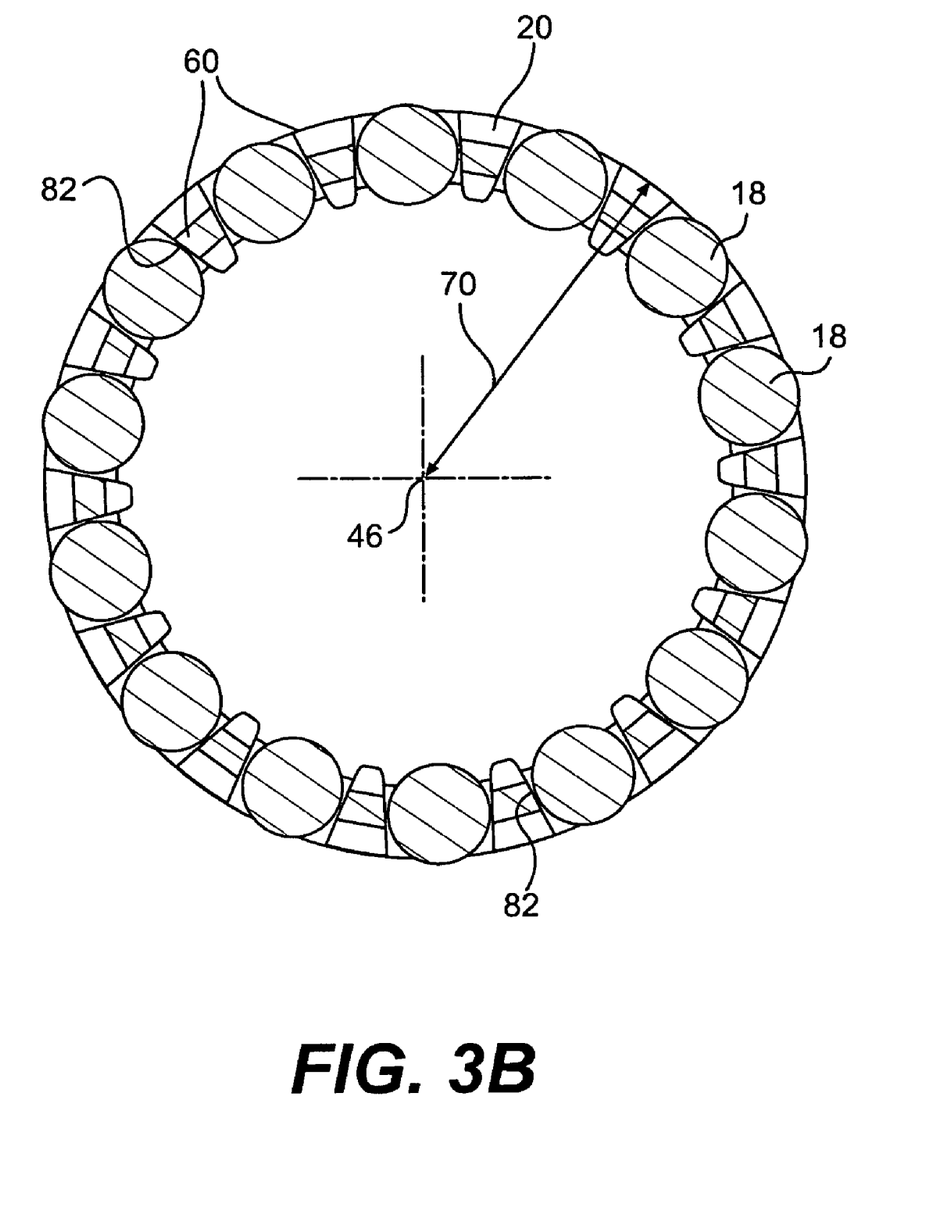
FIG. 3B is a sectional illustration through line 3B-3B of FIG. 3A.
Figure 3C:
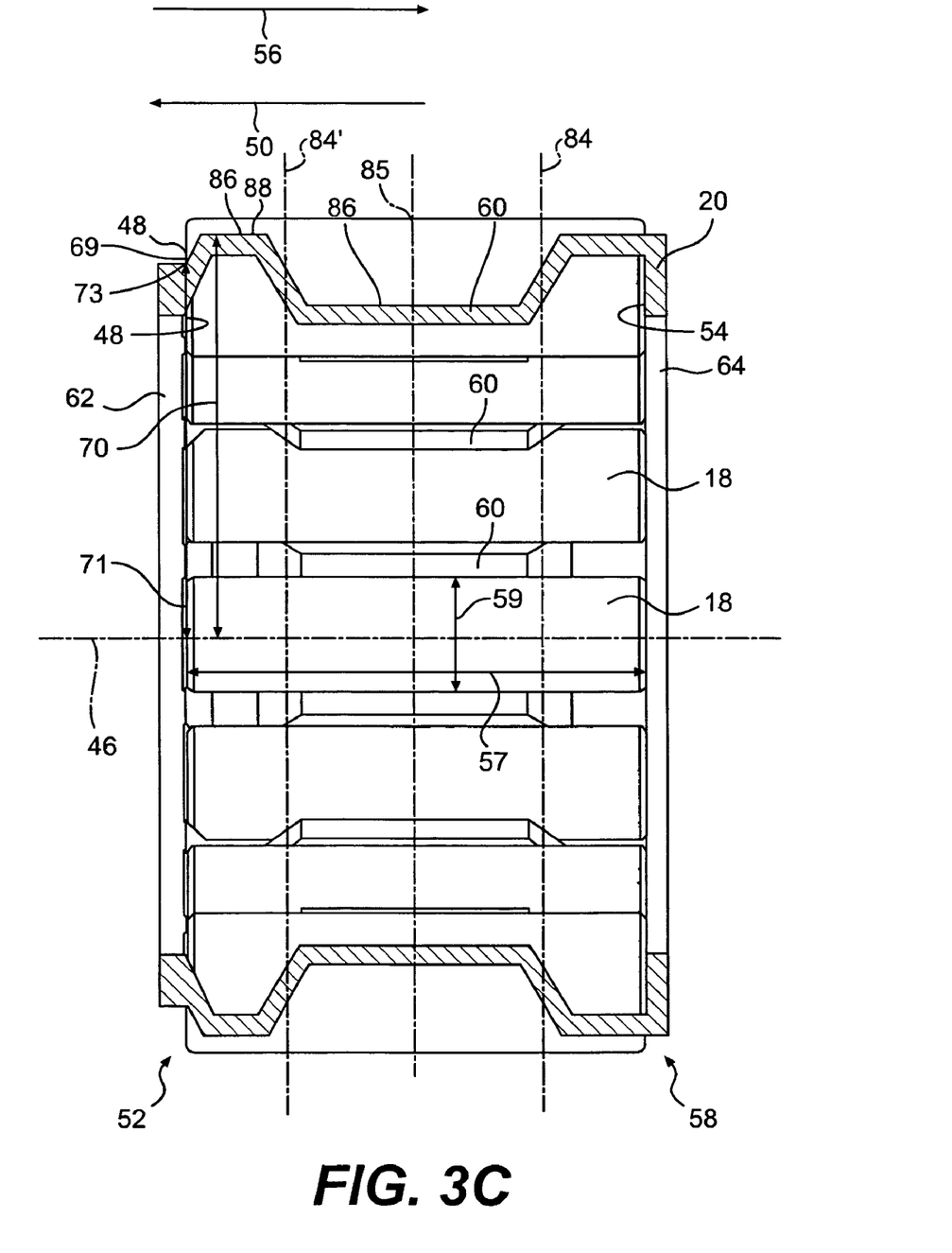
FIG. 3C is a sectional illustration through line 3C-3C of FIG. 3A.

FIGS. 3A-3C are illustrations of one embodiment of cylindrical rollers 18 and bearing cage 20, separate from rotary machine 10, showing certain features that these components may include. As is best seen in FIG. 3B, each bar 60 may include roller contact points 82, at which bar 60 contacts an adjacent cylindrical roller 18. In some embodiments, roller contact points 82 may be disposed in planes 84, 84' (shown in FIG. 3C), which may be distributed substantially symmetrically about a mid-plane 85 of an adjacent cylindrical roller 18. In some embodiments, cylindrical rollers 18 may have a length 57 and diameter 59 such that cylindrical rollers 18 are needle rollers. As is well-known in the roller bearing industry, cylindrical rollers 18 with a relatively high ratio of length 57 to diameter 59 are considered to be needle rollers.

INDUSTRIAL APPLICABILITY

The disclosed embodiments of rotary machine 10, cylindrical rollers 18, 22, and bearing cages 20, 24 may have application in any system requiring rotation of one component relative to another. The operation of a rotary machine 10 according to the disclosed embodiments is described below. Some aspects of operation of cylindrical rollers 22 and bearing cage 24 are not described, as they may function similar to cylindrical rollers 18 and bearing cage 20.

During relative rotation between inner component 16 and outer component 26, cylindrical rollers 18 may roll between cylindrical outer surface 36 and cylindrical inner surface 40. As they roll, cylindrical rollers 18 may drive bearing cage 20 around inner component 16. As long as bearing cage 20 is maintained in a proper spatial relationship with other components of rotary machine 10, it may guide cylindrical rollers 18 in such a manner to facilitate smooth rotation between outer component 26 and inner component 16.

However, if bearing cage 20 is not maintained sufficiently concentric to a central axis 38 of inner component 16, it may fail to provide proper guidance for cylindrical rollers 18. Additionally, high-speed rotation of carrier 14 around carrier rotation axis 34 may tend to drive bearing cage 20 out of concentricity with central axis 38 of inner component 16. During such rotation, inner component 16 may travel in a circular path around carrier rotation axis 34, and linear momentum of bearing cage 20 may tend to drive it away from carrier rotation axis 34 and out of concentricity with central axis 38.

Embodiments wherein cylindrical inner surface 40 has a radius 76 slightly larger than the maximum radial dimension 70 of bearing cage 20 may maintain bearing cage 20 substantially concentric to cylindrical inner surface 40 and central axis 38. In such embodiments, bearing cage 20 may shift only slightly from concentricity with central axis 38 before abutting cylindrical inner surface 40. This may ensure that bearing cage 20 is sufficiently concentric to central axis 38 to provide proper guidance for cylindrical rollers 18. Additionally, in many circumstances, momentum will drive oil in the same direction as bearing cage 20, which may help ensure lubrication at the point of abutment between bearing cage 20 and cylindrical inner surface 40. Principles of roller bearing design that are well-known in the roller bearing industry govern how much larger radius 76 can be than maximum radial dimension 70, while maintaining bearing cage 20 sufficiently concentric to central axis 38 to ensure that bearing cage 20 provides proper guidance for cylindrical rollers 18.

Additionally, during operation of rotary machine 10 axial loads may be applied to outer component 26. For example, in embodiments where rotary machine 10 is a planetary gear set, imperfections in the alignments and orientations of various components of rotary machine 10 in combination with rotary machine 10 interacting with other components may cause a thrust or axial load on outer component 26 in first direction 50 or second direction 56. The disclosed configurations of rotary machine 10 may allow axial loads on outer component 26 to be transferred from outer component 26, through cylindrical rollers 18, 22, to carrier 14. Axial loads applied to outer component 26 in second direction 56 may be transferred from outer component 26, through axial stop 28, through cylindrical rollers 18, and through axial stop 30, to carrier 14. Similarly, axial loads applied to outer component 26 in first direction 50 may be transferred from outer component 26, through axial stop 28, through cylindrical rollers 22, and through axial stop 32, to carrier 14.

A rotary machine 10 with a combination of provisions for maintaining bearing cage 20 substantially concentric to central axis 38 and provisions for axial loading of cylindrical rollers 18 may be well-suited for many applications. Construction of such a rotary machine 10 is facilitated by use of a bearing cage 20 wherein the maximum radial dimension 70 of portions between first end-faces 48 and second end-faces 54 is greater than a radial dimension 71 of portion 73 of bearing cage 20 axially outward of cylindrical rollers 18 adjacent first end-faces 48. Such a bearing cage 20 may have a close fit with cylindrical inner surface 40, while leaving radially-outer portions 69 of cylindrical rollers 18 exposed for abutment with axial stop 28.

It will be apparent to those skilled in the art that various modifications and variations can be implemented with rotary machine 10 without departing from the scope of the disclosure. Other embodiments will be apparent to those skilled in the art from consideration of the specification and practice of rotary machine 10. It is intended that the disclosure of these embodiments be considered as exemplary only, with a true scope of the disclosed embodiments being indicated by the following claims and their equivalents.

What is claimed is:

1. A rotary machine, comprising:
   an inner component;
   a first group of cylindrical rollers disposed around the inner component, each cylindrical roller having end-faces;
   an outer component with a first cylindrical inner surface disposed against the cylindrical rollers;
   a first bearing cage associated with the first group of cylindrical rollers, wherein at least a portion of the first bearing cage is disposed inside the first cylindrical inner surface, and wherein the first bearing cage and the first cylindrical inner surface are associated with one another in such a manner that contact between the first bearing cage and the first cylindrical inner surface maintains the first bearing cage substantially concentric to the first cylindrical inner surface;
   a first axial stop configured to limit axial movement between the outer component and one or more of the cylindrical rollers; and
   a second axial stop configured to limit axial movement between one or more of the cylindrical rollers and a component of the rotary machine other than the outer component and the first bearing cage.

2. The rotary machine of claim 1, wherein the first axial stop extends radially inward of the first cylindrical inner surface of the outer component and abuts radially-outer portions of the end-faces of one or more of the cylindrical rollers.

3. The rotary machine of claim 1, wherein the cylindrical rollers are needle rollers.

4. The rotary machine of claim 1, wherein:
   the outer component further includes a second cylindrical inner surface;
   the rotary machine further includes
      a second group of cylindrical rollers disposed between the inner component and the second cylindrical inner surface, each of the cylindrical rollers of the second group having end-faces,
      a second bearing cage associated with the second group of cylindrical rollers and disposed between the inner component and the second cylindrical inner surface,
      a third axial stop configured to limit axial movement between one or more of the cylindrical rollers of the second group and a component of the rotary machine other than the outer component; and
   the first axial stop is also configured to limit axial movement between the outer component and one or more of the cylindrical rollers of the second group.

5. The rotary machine of claim 4, wherein:
   at least a portion of the second bearing cage is disposed inside the second cylindrical inner surface; and
   the second bearing cage and the second cylindrical inner surface are associated with one another in such a manner to maintain the second bearing cage substantially concentric to the second cylindrical inner surface.

6. The rotary machine of claim 1, wherein the second axial stop includes a load ring extending around the inner component, wherein the load ring is captured between the end-faces of one or more of the cylindrical rollers and a component of the rotary machine other than the outer component.

7. The rotary machine of claim 1, wherein:
   the first bearing cage includes a plurality of bars disposed between the cylindrical rollers; and
   at least one of the bars includes roller contact points disposed substantially symmetrically about a mid-plane of an adjacent cylindrical roller.

8. The rotary machine of claim 6, wherein the cylindrical rollers are needle rollers.

9. The rotary machine of claim 1, further including:
a carrier rotatable about a carrier rotation axis; and
wherein the inner component is at least partially supported by the carrier at a distance from the carrier rotation axis.

10. A rotary machine, comprising:
a carrier rotatable around a carrier rotation axis;
an inner component mounted to the carrier, the inner component being disposed at a distance from the carrier rotation axis;
an outer component extending around the inner component, the outer component having a substantially cylindrical inner surface;
a first group of cylindrical rollers and a first bearing cage associated with the first group of cylindrical rollers disposed between the inner component and the outer component, wherein the substantially cylindrical inner surface is disposed against the first group of cylindrical rollers, and the first bearing cage and the substantially cylindrical inner surface are associated with one another in such a manner that contact between the first bearing cage and the substantially cylindrical inner surface maintains the first bearing cage substantially concentric to the first cylindrical inner surface;
a first axial stop configured to limit axial movement between the outer component and one or more of the cylindrical rollers; and
a second axial stop configured to limit axial movement between one or more of the cylindrical rollers and a component of the rotary machine other than the outer component.

11. The rotary machine of claim 10, wherein the cylindrical rollers are needle rollers.

12. The rotary machine of claim 10, wherein the first axial stop includes a rib extending radially inward from the outer component and abutting radially-outer portions of the end-faces of one or more of the cylindrical rollers.

13. The rotary machine of claim 10, wherein:
a first portion of the first bearing cage disposed axially outward of and adjacent the end-faces of the cylindrical rollers has a first radial dimension; and
at least a portion of the first bearing cage between the end-faces of one of the cylindrical rollers has a radial dimension greater than the first radial dimension.

14. The rotary machine of claim 13, wherein the first axial stop abuts exposed radially-outer portions of one or more of the end-faces of the cylindrical rollers adjacent the first portion of the first bearing cage.

15. The rotary machine of claim 10, further including:
a second group of cylindrical rollers disposed between the inner component and the outer component, each of the cylindrical rollers of the second group having end-faces;
a second bearing cage associated with the second group of cylindrical rollers and disposed between the inner component and the outer component;
a third axial stop configured to limit axial movement between one or more of the cylindrical rollers of the second group and a component of the rotary machine other than the outer component; and
wherein the first axial stop is also configured to limit axial movement between the outer component and one or more of the cylindrical rollers of the second group.

16. A rotary machine, comprising:
an inner component;
an outer component extending around the inner component;
a first group of cylindrical rollers disposed between the inner component and the outer component, each cylindrical roller having end-faces;
a first bearing cage associated with the first group of cylindrical rollers and disposed between the inner component and the outer component;
a first axial stop configured to limit axial movement between the outer component and one or more of the cylindrical rollers;
a second axial stop configured to limit axial movement between one or more of the cylindrical rollers and a component of the rotary machine other than the outer component; and
a first portion of the first bearing cage disposed axially outward of and adjacent the end-faces of the cylindrical rollers having a first radial dimension;
at least a portion of the first bearing cage between the end-faces of one of the cylindrical rollers having a radial dimension greater than the first radial dimension; and
wherein the first axial stop abuts radially-outer portions of one or more of the end-faces of the cylindrical rollers adjacent the first portion of the first bearing cage.

17. The rotary machine of claim 16, wherein the cylindrical rollers are needle rollers.

18. The rotary machine of claim 16, further including:
a second group of cylindrical rollers disposed between the inner component and the outer component, each of the cylindrical rollers of the second group having end-faces;
a second bearing cage associated with the second group of cylindrical rollers and disposed between the inner component and the outer component;
a third axial stop configured to limit axial movement between one or more of the cylindrical rollers of the second group and a component of the rotary machine other than the outer component; and
wherein the first axial stop is also configured to limit axial movement between the outer component and one or more of the cylindrical rollers of the second group.

19. The rotary machine of claim 18, wherein the first axial stop abuts radially-outer portions of the end-faces of one or more of the cylindrical rollers of the second group.

20. The rotary machine of claim 16, wherein:
the second axial stop includes a load ring extending around the inner component; and
wherein the load ring is captured between portions of the end-faces of one or more of the cylindrical rollers and a component of the rotary machine other than the outer component.

21. The rotary machine of claim 16, wherein the cylindrical rollers are needle rollers.

22. The rotary machine of claim 16, wherein:
the first bearing cage includes a plurality of bars disposed between the cylindrical rollers; and
at least one of the bars includes roller contact points disposed substantially symmetrically about a mid-plane of an adjacent cylindrical roller.

23. The rotary machine of claim 16, further including:
a carrier rotatable about a carrier rotation axis; and
wherein the inner component is at least partially supported by the carrier at a distance from the carrier rotation axis.

* * * * *